United States Patent [19]

Schmidt, Jr. et al.

[11] 4,289,630

[45] Sep. 15, 1981

[54] FILTER CAKE REMOVAL METHOD AND APPARATUS

[75] Inventors: Henry Schmidt, Jr., Hinsdale; Allen E. Cederholm, Western Springs; James F. Zievers, LaGrange, all of Ill.

[73] Assignee: Industrial Filter & Pump Mfg. Co., Cicero, Ill.

[21] Appl. No.: 102,258

[22] Filed: Dec. 10, 1979

[51] Int. Cl.³ ............................................. B01D 29/38
[52] U.S. Cl. .................................. 210/785; 210/796; 210/323.2; 210/332; 55/300
[58] Field of Search ............... 210/323 T, 332, 333 R, 210/346; 55/300; 270/789, 796

[56] References Cited

U.S. PATENT DOCUMENTS

| | | | |
|---|---|---|---|
| 3,212,643 | 10/1965 | Schmidt, Jr. | 210/346 X |
| 3,244,286 | 4/1966 | Schmidt, Jr. | 210/333 R |
| 3,618,300 | 11/1971 | Pausch | 55/300 X |
| 3,759,014 | 9/1973 | Van Dyken | 55/300 X |
| 3,796,316 | 3/1974 | Matz | 210/332 |
| 4,064,045 | 12/1977 | Schmidt, Jr. | 210/332 |

*Primary Examiner*—John Adee
*Attorney, Agent, or Firm*—Edmond T. Patnaude

[57] ABSTRACT

The exhaust manifold in a pressure filter is spring mounted and vibrated along a vertical axis to dislodge filter cakes from filter tubes suspended from the manifold.

15 Claims, 5 Drawing Figures

FILTER CAKE REMOVAL METHOD AND APPARATUS

The present invention relates in general to the art of pressure filtration wherein a filtrate passes through the porous surface of a filter element into a cavity therein, and it relates more particularly to a new and improved method and apparatus for cleaning the filter element after a filter cake has been deposited thereon.

BACKGROUND OF THE INVENTION

It is well known in the prior art to impart vibrational waves to filter elements such as filter tubes and filter leaves in order to remove filter cakes deposited thereon during a filtration cycle. When the cake is dried prior to the vibrating operation the operation is sometimes referred to as a dry cake discharge, and when carried out while the cake is wet or while immersed in liquid it is usually referred to as a wet cake discharge. U.S. Pat. Nos. 3,212,643 and 3,867,291 disclose ways in which shock waves have been used in the past to remove filter cakes from filter elements.

While the vibrating systems disclosed in the above patents and known in the prior art have been widely and successfully used, for many applications there is a need for a faster and more complete removal of the cake than has been heretofore attained.

SUMMARY OF THE INVENTION

Briefly, in accordance with one aspect of the invention the filter cakes are dried, and the filter elements are then reciprocated or vibrated in a direction parallel to the surfaces on which the cakes are deposited. During the subsequent filling of the filter tank the filter elements are vibrated to wash out any solids trapped in the interstices in the porous surfaces of the filter elements.

In accordance with another aspect of the invention the filter elements are supported in a vertical position by a horizontally disposed outlet manifold which is spring mounted in the filter tank, and vertically directed shock waves are imparted to the manifold to dislodge filter cakes from the filter elements. In a preferred embodiment of the invention the filter elements are tubular and are suspended from the manifold to which they are rigidly connected, and a pneumatically operated vibratory impactor is mounted directly on the manifold within the tank. In another embodiment of the invention the impactor is located above the tank and is connected to the manifold by means of an impactor bar which extends through a sealed opening in the top of the tank and preloaded against the manifold.

GENERAL DESCRIPTION OF THE DRAWINGS

The present invention will be better understood by a reading of the following detailed description taken in connection with the accompanying drawings wherein.

DETAILED DESCRIPTION OF PREFERRED EMBODIMENT OF THE INVENTION

Figure 1:
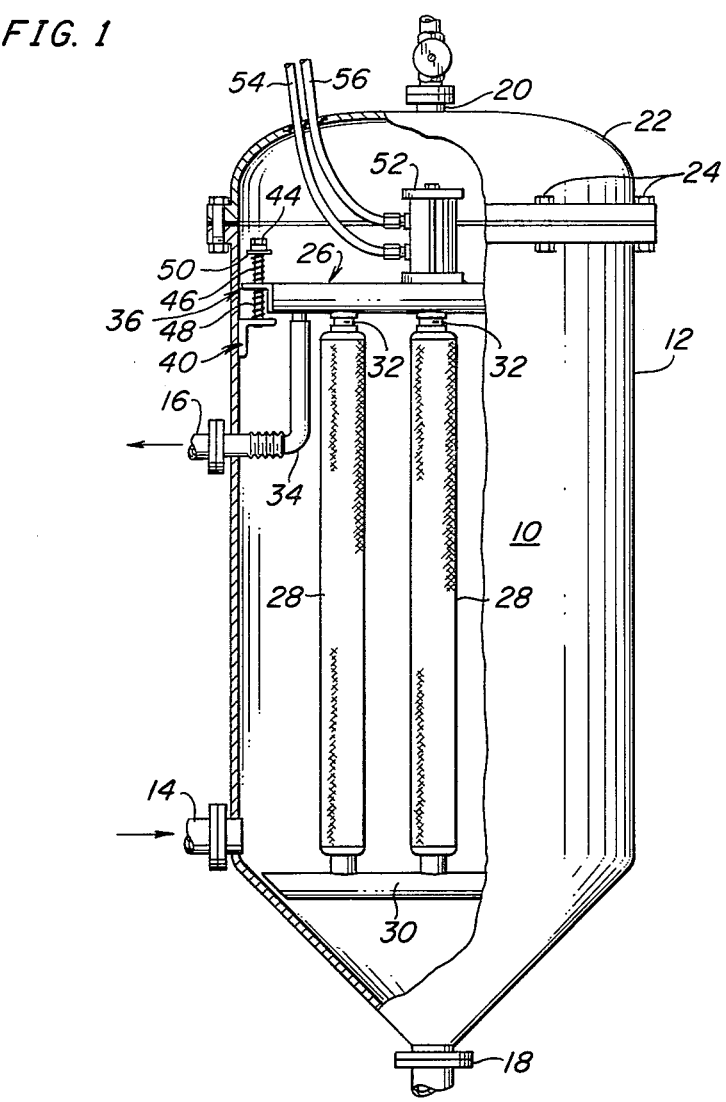
FIG. 1 is an elevational view, partly sectioned, of a pressure filter embodying certain features of the present invention.

Referring particulary to FIG. 1, there is shown a pressure filter 10 which comprises as its principal elements a generally cylindrical pressure tank 12 having a liquid inlet 14 through which a filtrate is supplied to the filter, and a liquid outlet 16 through which the effluent exits the filter. The tank has a tapered lower wall opening into a drain port 18, and an air inlet-outlet port 20 opens into the top of the tank through a cover 22. As shown, the cover 22 is sealably secured to the tank by means of a plurality of bolts 24.

An outlet manifold 26 having a passageway 27 therein is mounted near the top of the tank 12 and supports a plurality of tubular filter elements 28 which are suspended from the manifold. The manifold may include a central header from which a plurality of lateral sections extend as shown, for example, in U.S. Pat. No. 3,244,286. A tube spacer 30 is provided below the elements 28 to maintain the filter elements in substantial parallelism. The spacer may be of the type described in U.S. Pat. Nos. 3,244,286 and 3,438,502 or of any other suitable construction. The spacer 30 is preferably suspended from the manifold 26 to facilitate removal thereof from the tank with the manifold as well as to faciltate assembly thereof to the filter elements 28, but it may be mounted to the tank if desired. In those cases where the filter elements are relatively short, the spacer 30 may be eliminated altogether.

The filter elements may be of any suitable construction such as those well known in the art and which include a rigid core surrounded by a perforate filter medium to define an internal cavity in the filter element which communicates with the passageway 27 in the outlet manifold 26 via a tubular fitting 32. The core may be apertured near the bottom only as is the filter tube described in U.S. Pat. No. 3,438,502 or it may include an imperforate tube, open at the bottom, extending from the outlet at the top to a location near the bottom of the tube such as in the filter tubes described in U.S. Pat. Nos. 3,240,347 and 3,233,739. In either case, the filtrate passes through the perforate surface, downwardly to the bottom of the tube and then up through the tube to the outlet manifold at the top. The fitting 32 is preferably a short length of rigid tubing which extends upwardly from the filter tube and is threaded into a complementary opening in the bottom of the manifold. The fitting thus communicates the cavity within the outlet manifold to the central passage through the filter element and provides a rigid connection between the filter element and the manifold 26 which itself is a rigid structure.

The passageway in the outlet manifold 26 is coupled to the effluent outlet 16 by means of a conduit 34. As is more fully described hereinafter, the manifold is movably mounted within the tank 12, and therefore, the conduit 34 is at least partially flexible so as not to retard vertical movement of the manifold.

Figure 2:
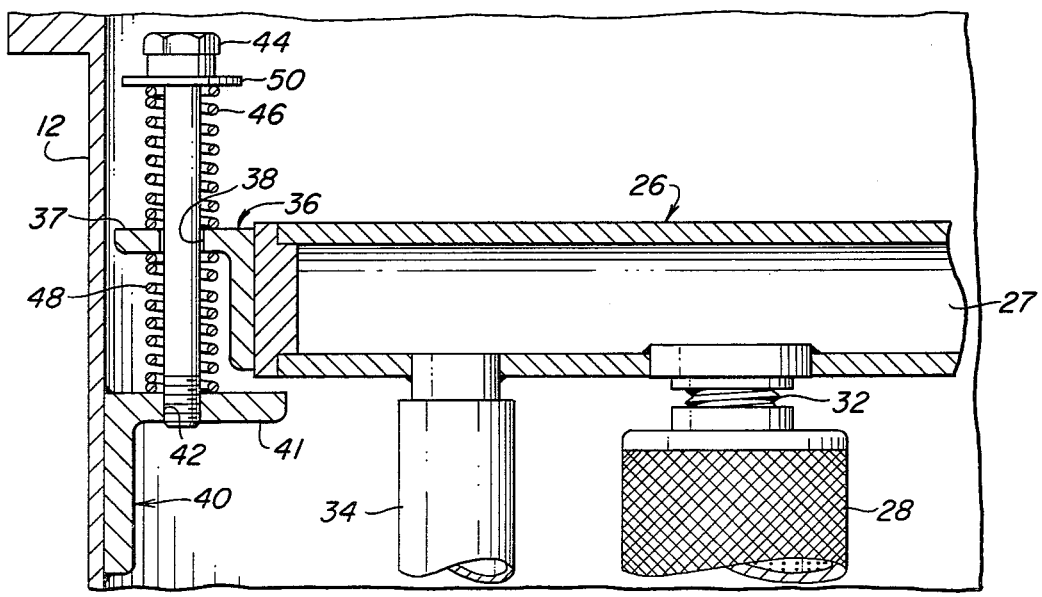
FIG. 2 is an enlarged sectional view showing the manner in which the outlet manifold is spring mounted in the filter of FIG. 1.

As best shown in FIG. 2, the manifold 26 is provided with a plurality of radially extending brackets 36 preferably three in number but only one being visible in FIG. 2, each having a horizontal flange 37 with a vertical hole 38 therethrough. A plurality of angle brackets 40 are welded to the inner wall of the tank at positions corresponding to the brackets 36 and each is provided with a hoirzontal flange 41 having a threaded hole 42 therethrough. A bolt 44 loosely extends through the hole 38 and is threaded into the hole 42. An upper coil spring 46 is positioned above the flange 37 and a lower coil spring 48 is positioned below the flange 37. The spring 48 is held under compression between the flanges 37 and 41, and during the filtration cycle holds the lower edge of the manifold 26 a short distance above the flange 41. The spring 46 is held under compression between the flange 37 and a washer 50.

Again referring to FIG. 1 a vibratory impactor 52 is mounted on the manifold 26 within the filter chamber to impart vertically directed shock waves to the manifold 26 and to the filter elements 28 connected thereto. The impactor 52 may be welded to the manifold as shown, or it may be rigidly secured thereto by bolts or by any other suitable means. The impactor 52 may be of any suitable type but is preferably of the pneumatic type described in U.S. Pat. No. 3,212,643 which vibrates at a relatively high frequency. Therefore, a pair of pneumatic lines 54 and 56 are connected to the impactor 52 and extend through the cover 22 to suitable air control valves and a source of air under pressure (not shown) for controllably operating the impactor 52 to vibrate the manifold 26 and the filter elements 28. In the filter 10, only one impactor 52 is provided and it is mounted on the principal longitudinal axis of the filter tank centrally of the outlet manifold 26. However, additional impactors may be used where necessary.

For a better understanding of the filter 10, consider a typical cycle of operation. With the drain 18 and the outlet 16 closed and the air line 20 open to the atmosphere, a prefilt liquid is pumped into the filter chamber through the inlet 14 to fill the tank. The air line 20 is then closed and the outlet 16 is opened whereby the prefilt liquid flows through the filter elements depositing a porous layer of a precoat material such as diatomaceous earth on the outer surfaces of the filter elements 28. The prefilt liquid is generally recirculated through the filter until the precoat layers have reached a desired thickness. The filter is then connected on line so that the filtrate then flows into the tank through the inlet 14 and the clarified effluent flows out of the tank through the outlet 16. As the filtrate flows into the cavities in the filter elements the solids entrained therein are deposited on the outer surfaces of the porous filter cakes on the filter elements. When the filter cakes have attained a thickness which interferes with the operating efficiency of the filter, the filter is taken off line by closing the filtrate inlet line. The drain line at the bottom is then opened to drain the filtrate from the filter chamber while air, under pressure, is supplied to the chamber through the port 20 and the effluent outlet 16 remains open. Preferably air is supplied under pressure to the chamber throughout the draining step so as to maintain a pressure drop across the filter cakes to prevent premature break away of the cakes from the filter elements. Air thus flows through the cakes to remove moisture from the cakes. The flow of air may then be terminated during the drain operation, and inasmuch as the outlet 16 is below the manifold 26, no liquid will drain back into the filter elements. If desired, a leaching liquid or the like may then be fed to the tank and passed through the cake. After leaching, the cakes can again be air dried in the manner described above. The impactor is then actuated to impart shocks or impulses to the manifold 26 and to the filter elements 28 which dislodges the filter cakes. The dislodged cakes drop to the bottom of the tank and pass out of the filter through the drain port 18.

The above process is then repeated to return the filter to on-line operation. During the subsequent fill step the impactor is actuated to vibrate the filter elements while they are immersed in the liquid. The reason for this is to wash out any solids which have been trapped in the interstices of the perforate surfaces of the filter elements.

It should be noted that the conduit 34 connects to the bottom of the manifold 26. Consequently, the manifold 26 is completely drained of liquid during the cake drying step, and therefore, liquid cannot drain back into the filter elements when the air line 20 is closed at the end of the cake drying step. Were the outlet port from the manifold to be located above the bottom wall of the passageway in the outlet manifold, some effluent would flow back into the tubes and dislodge the lower portions of the cakes making subsequent leaching of the cakes difficult if not impossible.

Figure 3:
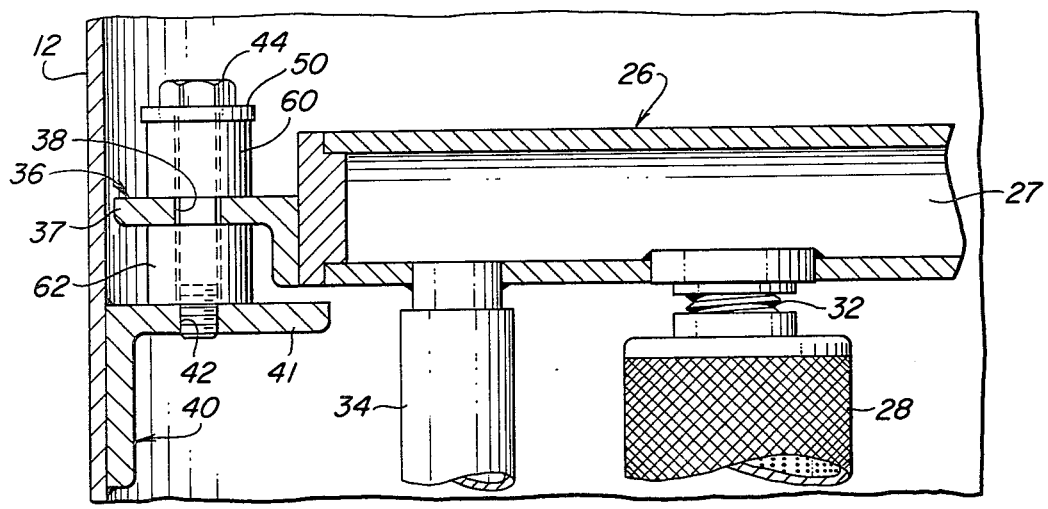
FIG. 3 is a cross-sectional view showing another manner of mounting an outlet manifold.

Referring to FIG. 3, there is shown an alternative embodiment of the invention wherein the springs 46 and 48 are replaced by a pair of elastomeric sleeves 60 and 62 formed of rubber or other suitable material which is compatible with the materials to be filtered.

Figure 4:
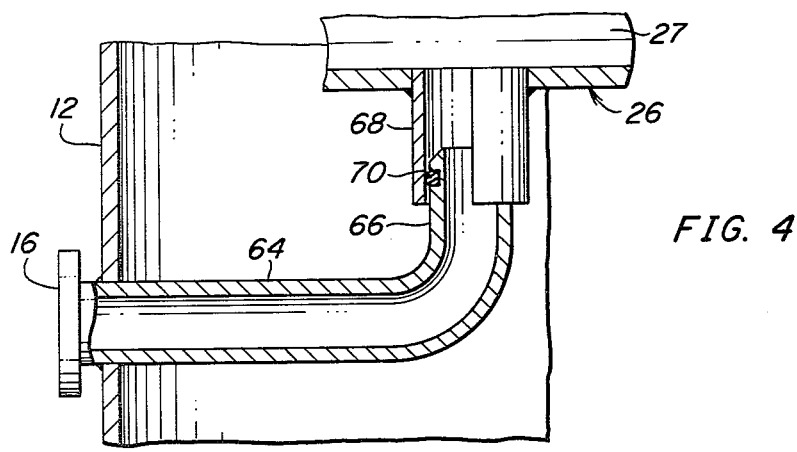
FIG. 4 is a partially sectioned view showing an alternative manner of coupling the outlet manifold to the outlet fitting of the filter.

Referring to FIG. 4, there is shown still another embodiment of the invention wherein the flexible conduit 34 is replaced by a telescopic connection permitting relative vertical movement between the outlet manifold and the filter tank. As there shown, the effluent outlet 16 includes a rigid pipe 64 which extends horizontally into the tank and has an upturned inner end portion 66. A rigid pipe 68 which depends from the manifold 26 is telescopically fitted over the end portion 66, and an elastomeric O-ring 70 which is mounted in an annular groove near the top of the portion 66 is compressed against the inner surface of the pipe 68. Vertical vibration of the manifold and filter elements can thus be effected by activation of the vibratory impactor 52. Moreover, removal of the manifold from the tank is facilitated by this telescopic, sealed connection to the effluent outlet.

Figure 5:
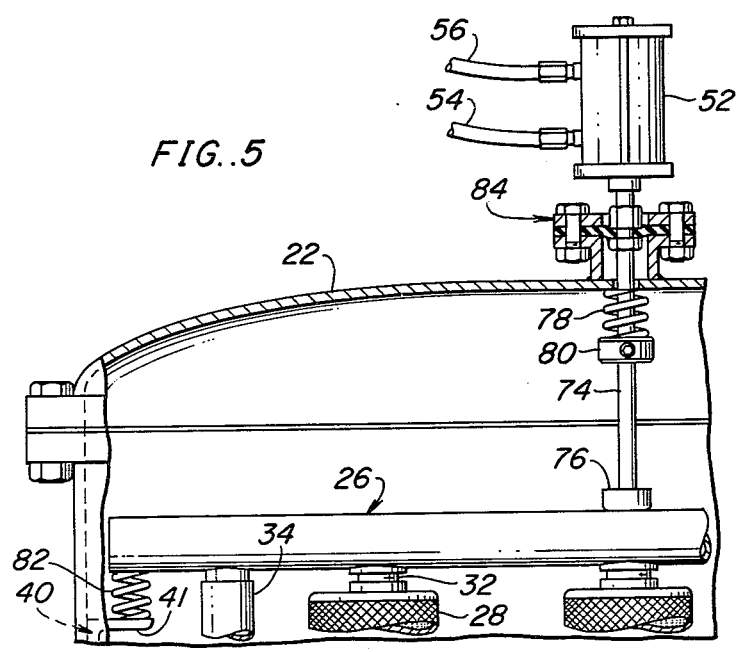
FIG. 5 is a fragmentary view of the pressure filter constituting an alternative embodiment of the invention.

Referring to FIG. 5, there is shown another alternative embodiment of the invention wherein the vibratory impactor 52 is mounted externally of the filter tank. In accordance with this embodiment of the invention the vibratory impactor 52 is rigidly connected to the upper end of a vertical bar 74 having a rigid pad 76 at its lower end. The pad 76 is preloaded against the top surface of the manifold 26 by the weight of the impactor 52 and by the force exerted by a coil spring 78 which is compressed between the cover 22 and a collar 80 affixed to the bar 74. The collar 80 is threadedly connected to the bar 74 to permit adjustment of the contact pressure between the pressure vibrator pad 76 and the manifold 26. Other methods of adjustment can be used if desired. A plurality of coil springs 82, only one of which is shown in FIG. 5 respectively rest on the brackets 40 and provide the floating support for the manifold 26 and the associated filter elements 28. A diaphragm type seal 84, such as that described in U.S. Pat. No. 3,212,643, provides the necessary seal between the bar 74 and the cover 22 of the filter tank. In this embodiment of the invention the manifold and tube assembly is floated between the springs 78 and 82 wherefor the vibrations set up in the manifold and in the filter elements during the vibration step are not dampened. Preferably the upper and lower springs are selected so that the upward and downward forces on the manifold are substantially equal whereby it floats and vibrational shock waves can be established with one or more relatively small vibratory impactors.

The preferred embodiment of the invention which is described herein employs filter tubes which are vertically vibrated at a frequency in the range of 2500 to 4500 cycles per minute although this frequency range is not believed to be critical. This same method of spring mounting the outlet manifold can be used with filter leaves. Moreover, for some applications horizontally directed shock waves may be applied to the manifold to effect lateral vibrations of either filter tubes or filter leaves.

The outlet from the manifold is below the bottom of the manifold in order to completely drain the manifold during the cake drying operation when air or other gas is passed through the cake. It will be understood, however, that other arrangements for completely draining the manifold could be used.

While the present invention has been described in connection with particular embodiments thereof, it will be understood by those skilled in the art that many changes and modificiations may be made without departing from the true spirit and scope of the present invention. Therefore, it is intended by the appended claims to cover all such changes and modificaitions which come within the true spirit and scope of this invention.

What is claimed:

1. A filter, comprising in combination
    a filter tank enclosing a filter chamber,
    a liquid inlet opening into said tank through which a filtrate may be introduced into said chamber,
    a rigid, generally planar tubular header manifold having a passageway therein,
    spring means supporting said manifold in said chamber,
    an effluent outlet from said tank,
    conduit means connecting said passageway to said outlet, a plurality of filter elements each having a perforate filter media overlying an internal cavity therein,
    said filter elements being fixedly mounted at one end to said header with said cavities being in communication with said passageway,
    said filter elements being in mutually parallel relationship, the outer surfaces of said filter media extending in a direction perpendicular to the plane of said header manifold and
    vibratory impactor means connected to said manifold for impacting said manifold in a direction parallel to the outer surface of said filter media.
2. A filter according to claim 1 wherein
    said filter elements are tubular and are suspended from said manifold.
3. A filter according to claim 1 wherein
    said vibratory means is mounted within said tank.
4. A filter according to claim 3 wherein
    said vibratory means imparts vertical shock waves to said manifold and to said filter elements.
5. A filter according to claim 4 wherein
    said vibratory means is supported by said manifold.
6. A filter according to claim 1 wherein
    said conduit means comprises a flexible, tubular member.
7. A filter according to claim 1 wherein said conduit means comprises
    first and second telescopically interfitted tubular members respectively connected to said manifold and to said outlet.
8. A method of removing a filter cake from the surface of a filter element mounted in a filter tank on a rigid outlet manifold, comprising the steps of
    mounting said manifold in said tank on springs to permit movement of said manifold relative to said tank, and
    repeatedly impacting said manifold in a direction parallel to said surface of said filter element to exert a shear force between said filter element and said cake to separate said cake from said filter element.
9. A method according to claim 8 wherein said step of imparting vibrational shock waves to said manifold is carried out by
    mounting a vibratory impactor on said manifold.
10. A filter, comprising
    a sealable filter tank enclosing a filter chamber,
    a liquid inlet to said tank,
    an outlet manifold disposed in said tank,
    said outlet having a passageway therein,
    a plurality of filter elements each having a cavity therein at least partially enclosed by perforate means,
    said filter elements being disposed below said outlet manifold with said cavities being in communication with said passageway in said outlet manifold,
    a liquid outlet from said tank located below the bottom of said manifold, and
    conduit means connecting said liquid outlet to the bottom of said manifold.
11. A filter according to claim 10 comprising
    first spring means supporting said manifold in said tank, and
    second spring means urging said manifold toward said first spring means.
12. A filter according to claim 11 comprising
    a vibratory impactor disposed above said manifold, and
    said second spring means urging said impactor into contacting relationship with said manifold.
13. A filter according to claim 12 wherein
    said vibratory impactor is at least partially located externally of said tank.
14. A filter according to claim 13 comprising
    means for adjusting the relative forces exerted by said springs on said manifold.
15. A filter according to claim 14 wherein said vibratory impactor comprises
    a vertically disposed rigid bar extending into said chamber through an opening in the top of said tank, and
    a hermetic seal provided between said bar and said tank.

* * * * *